US010630451B2

United States Patent
Fan et al.

(10) Patent No.: US 10,630,451 B2
(45) Date of Patent: *Apr. 21, 2020

(54) SENDING AND RECEIVING ACKNOWLEDGEMENT INFORMATION OF SEMI-PERSISTENT SCHEDULING DATA PACKETS

(71) Applicant: HUAWEI TECHNOLOGIES CO., LTD., Shenzhen, Guangdong (CN)

(72) Inventors: Xiaoan Fan, Beijing (CN); Guang Liu, Shenzhen (CN); Bo Li, Beijing (CN); Yunzhe Hou, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 16/258,545

(22) Filed: Jan. 26, 2019

(65) Prior Publication Data

US 2019/0158256 A1 May 23, 2019

Related U.S. Application Data

(63) Continuation of application No. 15/494,549, filed on Apr. 24, 2017, now Pat. No. 10,237,042, which is a
(Continued)

(30) Foreign Application Priority Data

Nov. 5, 2008 (CN) .......................... 2008 1 0217254

(51) Int. Cl.
*H04L 5/00* (2006.01)
*H04L 1/18* (2006.01)
(Continued)

(52) U.S. Cl.
CPC .......... *H04L 5/0055* (2013.01); *H04L 1/1854* (2013.01); *H04L 1/1861* (2013.01); *H04W 72/12* (2013.01); *H04L 1/1614* (2013.01)

(58) Field of Classification Search
CPC ....... H04L 5/0055; H04L 1/854; H04L 1/861; H04L 1/1614; H04W 72/12
See application file for complete search history.

(56) References Cited

U.S. PATENT DOCUMENTS 6,967,940 B2   11/2005   Marinier et al.
7,373,148 B2    5/2008   Kim et al.
(Continued)

FOREIGN PATENT DOCUMENTS

CN   1551677 A   12/2004
CN   1669232 A    9/2005
(Continued)

OTHER PUBLICATIONS

R1-083740 Ericsson,"Remaining issues on transmission of ACK/NAK on PUSCH for LTE TDD", TSG-RAN WG1 #54bis, Prague, Czech Republic, Sep. 29-Oct. 3, 2008,total 7 pages.
(Continued)

*Primary Examiner* — Habte Mered
(74) *Attorney, Agent, or Firm* — Huawei Technologies Co., Ltd.

(57) ABSTRACT

The application relates to radio communication technologies and discloses a method for receiving semi-persistent scheduling (SPS) data packets and sending acknowledgment information of the SPS data packets. A communication apparatus receives physical downlink shared channel (PDSCH) data packets from a base station. The PDSCH data packets include one or more dynamic scheduling data packets and one or more semi-persistent scheduling (SPS) data packets. The communication apparatus sends, to the base
(Continued)

station, a sequence including feedback information of the PDSCH data packets. The sequence includes a plurality of bits. Each bit carries an acknowledgement (ACK) or a negative acknowledgement (NAK) to one PDSCH data packet respectively. The bits carrying acknowledgements of the one or more SPS data packets are arranged at the end of the sequence.

21 Claims, 8 Drawing Sheets

Related U.S. Application Data continuation of application No. 14/961,909, filed on Dec. 8, 2015, now Pat. No. 9,634,818, which is a continuation of application No. 14/056,956, filed on Oct. 18, 2013, now Pat. No. 9,240,875, which is a continuation of application No. 13/720,915, filed on Dec. 19, 2012, now Pat. No. 8,565,182, which is a continuation of application No. 13/094,697, filed on Apr. 26, 2011, now Pat. No. 8,358,621, which is a continuation of application No. 12/610,618, filed on Nov. 2, 2009, now Pat. No. 8,249,010, which is a continuation of application No. PCT/CN2009/071486, filed on Apr. 27, 2009.

(51) Int. Cl.
*H04W 72/12* (2009.01)
*H04L 1/16* (2006.01)

(56) References Cited

U.S. PATENT DOCUMENTS

| 7,912,007 | B2 | 3/2011 | Fan et al. |
| 7,979,784 | B2 | 7/2011 | Shao et al. |
| 8,737,346 | B2 | 5/2014 | Che et al. |
| 9,369,238 | B2 | 6/2016 | Larsson et al. |
| 2004/0202140 | A1 | 10/2004 | Kim et al. |
| 2006/0252439 | A1 | 11/2006 | Cai et al. |
| 2006/0256758 | A1 | 11/2006 | Malkamaki et al. |
| 2007/0147333 | A1 | 6/2007 | Makhijani |
| 2007/0168831 | A1 | 7/2007 | Kim et al. |
| 2007/0189205 | A1 | 8/2007 | Terry et al. |
| 2008/0009262 | A1 | 1/2008 | Rudolf et al. |
| 2008/0090583 | A1 | 4/2008 | Wang et al. |
| 2008/0117891 | A1 | 5/2008 | Damnjanovic et al. |
| 2008/0175195 | A1 | 7/2008 | Cho et al. |
| 2008/0192674 | A1 | 8/2008 | Wang et al. |
| 2008/0232284 | A1 | 9/2008 | Dalsgaard et al. |
| 2008/0273513 | A1 | 11/2008 | Montojo et al. |
| 2009/0257408 | A1 | 10/2009 | Zhang et al. |
| 2009/0290538 | A1 | 11/2009 | Kim et al. |
| 2010/0027446 | A1 | 2/2010 | Choi et al. |
| 2010/0027447 | A1 | 2/2010 | Choi et al. |
| 2010/0034158 | A1 | 2/2010 | Meylan et al. |
| 2010/0040005 | A1 | 2/2010 | Kim et al. |
| 2010/0210256 | A1 | 8/2010 | Shen et al. |
| 2010/0260135 | A1 | 10/2010 | Fan et al. |
| 2011/0026444 | A1 | 2/2011 | Dai et al. |
| 2011/0149717 | A1 | 6/2011 | Dai et al. |

FOREIGN PATENT DOCUMENTS

| CN | 101114868 A | 1/2008 |
| CN | 101167313 A | 4/2008 |
| CN | 101212251 A | 7/2008 |
| CN | 101267284 A | 9/2008 |
| CN | 101296061 A | 10/2008 |
| CN | 101340442 A | 1/2009 |
| CN | 101499882 A | 8/2009 |
| EP | 1986459 A1 | 10/2008 |
| EP | 2037695 A1 | 3/2009 |
| EP | 2080295 B1 | 5/2015 |
| JP | 2010502127 A | 1/2010 |
| JP | 2012213172 A | 11/2012 |
| KR | 20080092222 A | 10/2008 |
| WO | 2004100590 A1 | 11/2004 |
| WO | 2007072341 A2 | 6/2007 |
| WO | 2007148706 A1 | 12/2007 |
| WO | 2008024890 A2 | 2/2008 |
| WO | 2008041805 A1 | 4/2008 |
| WO | 2008115134 A2 | 9/2008 |
| WO | 2008127015 A1 | 10/2008 |

OTHER PUBLICATIONS

R1-084369 Ericsson et al.,"ACK/NACK transmission on PUSCH for LTE TDD",3GPP TSG-RAN1 Meeting #55 , Prague, Czech Republic, Nov. 10-14, 2008,total 7 pages.
3GPP TSG-RAN2 Meeting #64 R2-086490,"The Reliability of SPS activation",CATT,Nov. 10-14, 2008,total 5 pages.
3GPP TSG-RAN-WG1 Meeting #55 R1-084344,"Remaining Issues of ACK/NAK Multiplexing on PUSCH",Huawei etal., Nov. 10-14, 2008,total 4 pages.
Brian Classon:"Huawei LTE and LTE-A contributions for RAN1 55",3GPP server, XP002636808,Nov. 4, 2008, total 4 pages.
3GPP TSG-RAN-WG1 Meeting #53bis R1-082359,"Implict mapping between CCE and PUCCH for ACK/NACK TDD", Huawei et al.,Jun. 30-Jul. 4, 2008,total 4 pages.
3GPP TSG RAN WG1 Meeting #54bis R1-084059,"Way Forward on Remaining Issues for TDD ACK/NAKTransmission on PUSCH",Catt et al.,Sep. 29-Oct. 3, 2008,total 4 pages.
TSG-RAN WG1 #55 R1-084334,"Channel Models for LTE-Advanced Evaluations",CMCC et al.,Nov. 10-14, 2008, total 3 pages.
Kim,H.S.,et al.,U.S. Appl. No. 61/046,777,entitled "New PUCCH Index Generation," filed Apr. 21, 2008, total 15 pages.
Kim,H.S.,et al.,U.S. Appl. No. 61/073,034,entitled "Correction of PUCCH Index Generation," filed Jun. 17, 2008,total 22 pages.
Kim,H.S.,et al.,U.S. Appl. No. 61/088,343,entitled "Shortened Scheduling Request," filed Aug. 12, 2008,total 10 pages.
Kim,H.S.,et al.,U.S. Appl. No. 61/090,610,entitled "Shortened SR and Related ULConfigurations," filed Aug. 20, 2008,total 11 pages.
Wang, et al. U.S. Appl. No. 60/889,148,entitled "Method and Apparatus for AcknowledgementSignaling",filed Feb. 9, 2007,total 35 pages.
Samsung, "On ACK/NAK PUCCH resources compression in TDD", 3GPP TSG-RAN1 Meeting #54 R1-083559, Sep. 29, 2008,total 6 pages.
Noki NSN, "Remaining Issues for ACK/NAK on PUSCH in LTE TDD", 3GPP TSG-RAN1 Meeting #54 R1-083723, Oct. 3, 2008,total 8 pages.
NEC Group, "DL Multiplexing for Persistent and Dynamic scheduling", R1-073460, 3GPP, Aug. 15, 2008,total 3pages.
Samsung, "ACK/NAK Repetitions in E-UTRA UL", R1-082303, 3GPP, Jun. 25, 2008,total 5 pages.
Huawei, "Remaining issues on PDCCH for semi-persistent scheduling", R1-083691, 3GPP, Sep. 24, 2008,total4 pages.
Texas Instruments, "On remaining issues of TDD ACK/NAK transmission on PUSCH", R1-083525, 3GPP, Sep. 24, 2008,total 3 pages.
3GPP TS 36.212 V8.4.0,3rd Generation Partnership Project;Technical Specification Group Radio Access Network; Evolved Universal Terrestrial Radio Access (E-UTRA);Multiplexing and channel coding(Release 8),Sep. 2008, total 56 pages.
3GPP TS 36.213 V8.4.0,3rd Generation Partnership Project;Technical Specification Group Radio Access Network; Evolved Universal Terrestrial Radio Access (E-UTRA);Physical layer procedures(Release 8),Sep. 2008,total 60pages.
3GPP TS 36.213 V8.5.0,3rd Generation Partnership Project;Technical Specification Group Radio Access Network; Evolved Universal Terrestrial Radio Access (E-UTRA);Physical layer procedures(Release 8),Dec. 2008,total 74pages.

(56) References Cited

OTHER PUBLICATIONS

Motorola et al, ACK/NACK Bundling for TDD : Way Forward. R1-082100, May 14, 2008, 6 pages.
CATT, Multiple ACK/NACKs transmission for TDD. 3GPP TSG RAN WG1 meeting #52bis Shenzhen, china, Mar. 31-Apr. 4, 2008, R1-081325, 4 pages.

SENDING AND RECEIVING ACKNOWLEDGEMENT INFORMATION OF SEMI-PERSISTENT SCHEDULING DATA PACKETS

CROSS-REFERENCE TO RELATED APPLICATIONS

This application is a continuation of U.S. patent application Ser. No. 15/494,549, filed on Apr. 24, 2017, which is a continuation of U.S. patent application Ser. No. 14/961,909, filed on Dec. 8, 2015, now U.S. Pat. No. 9,634,818. The U.S. patent application Ser. No. 14/961,909 is a continuation of U.S. patent application Ser. No. 14/056,956, filed on Oct. 18, 2013, now U.S. Pat. No. 9,240,875. The U.S. patent application Ser. No. 14/056,956 is a continuation of U.S. patent application Ser. No. 13/720,915, filed on Dec. 19, 2012, now U.S. Pat. No. 8,565,182. The U.S. patent application Ser. No. 13/720,915 is a continuation of U.S. patent application Ser. No. 13/094,697, filed on Apr. 26, 2011, now U.S. Pat. No. 8,358,621. The U.S. patent application Ser. No. 13/094,697 is a continuation of U.S. patent application Ser. No. 12/610,618, filed on Nov. 2, 2009, now U.S. Pat. No. 8,249,010. The U.S. patent application Ser. No. 12/610,618 is a continuation of International Application No. PCT/CN2009/071486, filed on Apr. 27, 2009. The International Application claims priority to Chinese Patent Application No. 200810217254.3, filed on Nov. 5, 2008. All of the afore-mentioned patent applications are hereby incorporated by reference in their entireties.

TECHNICAL FIELD

The disclosure relates to radio communication technologies, and in particular, to a method and apparatus for sending and receiving acknowledgement information of semi-persistent scheduling data packets.

BACKGROUND

Two modes are supported in 3GPP E-UTRA (Third Generation Partnership Project-Evolved Universal Terrestrial Radio Access) systems: frequency division duplexing (FDD) mode and time division duplexing (TDD) mode. For the TDD mode, the duration (length) of a radio frame is 10 milliseconds (ms) and the radio frame includes two 5 ms length half-frames. Each half-frame includes eight 0.5 ms timeslots and three special fields. Two timeslots form a subframe, and the three special fields together form a special subframe. The three special fields are a downlink pilot timeslot (DwPTS), a guard period (GP) and an uplink pilot timeslot (UpPTS). The length of each subframe is 1 ms.

Currently, in the 3GPP E-UTRA systems, there are two modes for feeding back, in an uplink subframe, acknowledgement or negative acknowledgement (ACK/NAK) information of multiple downlink subframes. The two modes are multiplexing mode and bundling mode. In the multiplexing mode, if a feedback is carried in a physical uplink control channel (PUCCH), the feedback is related to an uplink-downlink configuration. If the feedback is carried in a physical downlink shared channel (PDSCH), the number of feedback bits depends on whether there is an uplink grant (UL Grant) signaling. If there is the UL Grant signaling, the number of bits that a user equipment device (UE) is required to feed back is specified through an uplink data assignment indicator (UL DAI) field of the UL Grant signaling. For example, if a base station (BS) schedules a number x of the total N downlink subframes, the UE feeds back x ACKs/NAKs. If there is no UL Grant signaling, the UE feeds back N bits of ACK/NAK, and a non-scheduled downlink subframe corresponds to a NAK.

In the bundling mode, no matter whether the feedback information is carried in the PUCCH or in the PUSCH, only 1-bit ACK/NAK information is sent to represent all the scheduled downlink subframes. As long as the feedback to one of the scheduled downlink subframes is a NAK, the feedback sent is a NAK. Only when feedbacks to all the scheduled downlink subframes are ACKs, the feedback sent is an ACK.

Two scheduling modes are defined in the current Long Term Evolution (LTE) protocol: dynamic scheduling mode and semi-persistent scheduling (SPS) mode. This means there are two ways of indicating resources for data transmission. In the dynamic scheduling mode, for each new data packet, there is a control signaling in a physical downlink control channel (PDCCH) to indicate a resource and a transmission mode. The UE receives downlink data and transmits uplink data according to the PDCCH sent by the base station (BS). In the SPS mode, the BS sends a PDCCH control signaling only when the SPS transmission is activated. The UE activates the SPS transmission according to the position and time indicated by the PDCCH. The UE transmits and receives data packets periodically, until another PDCCH in a special format is received, which terminates the SPS transmission.

Because the PDCCH is used for indicating both dynamic scheduling mode and semi-persistent scheduling mode, the UE differentiates whether the scheduling mode is the dynamic scheduling or the semi-persistent scheduling by recognizing different identifiers (IDs) used in scrambling a cyclic redundancy check (CRC) of the PDCCH. In the dynamic scheduling mode, the CRC of the PDCCH is scrambled with a cell radio network temporary identifier (C-RNTI). In the semi-persistent scheduling mode, the CRC of the PDCCH is scrambled with a semi-persistent scheduling cell radio network temporary identifier (SPS-C-RNTI). When the UE detects that the PDCCH is scrambled with the SPS-C-RNTI, the UE activates the semi-persistent transmission, and receives or transmits data according to the indication in the PDCCH. Within a subsequent period of time, the UE receives and transmits data only according to the position indicated by the PDCCH when the semi-persistent transmission is activated, making it unnecessary to notify the UE each time of the positions of resources for SPS data packets through the PDCCH. When the positions of the SPS resources need to be changed, a new PDCCH may be used to replace the previous semi-persistent scheduling configuration at the end of the period of the SPS data transmission. The semi-persistent transmission is cancelled by a PDCCH scrambled with an SPS-C-RNTI in a special format.

In the uplink ACK/NAK multiplexing mode of the prior art, the first position of K ACKs/NAKs fed back by the UE is the ACK/NAK of a SPS subframe, and the positions of the ACKs/NAKs of other subframes are arranged in the sequence of downlink data assignment indicator (DL DAI). If the UE does not detect data in a subframe, the UE feeds back a NAK. If the UE did not receive the SPS activation signaling, the UE feeds back a NAK at the first position. Based on the NAK, the BS thinks that the control signaling is received properly but data is wrong, thus the feedback information is incorrectly received. As a result, the BS does not retransmit a PDCCH, and the UE still does not know the position of the semi-persistent transmission, which causes unnecessary retransmission.

SUMMARY OF THE INVENTION

One objective of embodiments of the present invention is to provide a method and apparatus for feeding back ACK information of SPS data packets so that the ACK information of downlink data can be fed back properly.

Another objective of embodiments of the present invention is to provide a method and apparatus for receiving ACK information of SPS data packets so that the ACK information of downlink data can be received properly.

To achieve the preceding objectives, embodiments of the present invention provide the following technical solutions. A method for feeding back ACK information of SPS data packets includes: receiving downlink data and an uplink data assignment indicator (UL DAI) from a base station (BS), where a value of the UL DAI indicates a number (N) of downlink data packets; and feeding back a sequence comprising N ACKs/NAKs to the BS. In the sequence, position(s) from the $(N-k+1)^{th}$ position to the $N^{th}$ position, is/are used for placing feedback information of k SPS data packets of the downlink data packets.

A method for receiving ACK information of SPS data packets includes: sending downlink data and an uplink data assignment indicator (UL DAI) to a user equipment (UE), where a value of the UL DAI indicates a number (N) of downlink data packets; and receiving a sequence comprising N ACKs/NAKs from the UE. In the sequence, position(s) from the $(N-k+1)^{th}$ position to the $N^{th}$ position is/are used for placing feedback information of k SPS data packets of the downlink data packets.

An apparatus for feeding back ACK information of SPS data packets includes: a receiving unit configured to receive downlink data and an uplink data assignment indicator (UL DAI) from a base station (BS), wherein a value of the UL DAI indicates a number (N) of downlink data packets; a processing unit configured to place ACKs/NAKs of k SPS data packets of the downlink data packets at positions from the $(N-k+1)^{th}$ ACK/NAK to the $N^{th}$ ACK/NAK; and a feedback unit configured to feed back a sequence comprising N ACKs/NAKs to the BS.

An apparatus for receiving ACK information of SPS data packets includes: a sending unit configured to send downlink data and an uplink data assignment indicator (UL DAI) to a user equipment (UE), wherein a value of the UL DAI indicates a number (N) of downlink data packets; and a receiving unit configured to receive a sequence comprising N ACKs/NAKs fed back by the UE. In the sequence, position(s) from the $(N-k+1)^{th}$ position to the $N^{th}$ position is/are used for placing feedback information of k SPS data packets of the downlink data packets.

Compared with the prior art, embodiments of the present invention have the following differences and benefits. The ACKs/NAKs of k SPS data packets of the downlink data packets are placed to positions from the $(N-k+1)^{th}$ ACK/NAK to the $N^{th}$ ACK/NAK. When the SPS activation PDCCH signaling or the override PDCCH signaling of the SPS subframes is lost, the UE cannot differentiate whether the subframes are dynamic scheduling subframes or SPS subframes. However, if the ACKs/NAKs of the SPS data packets of the downlink data packets are placed at the $(N-k+1)^{th}$ ACK/NAK to the $N^{th}$ ACK/NAK for feedback can be received by the BS correctly, such that unnecessary data retransmissions may be reduced, thus saving resources.

DETAILED DESCRIPTION

The following describes the embodiments of the present invention in detail with reference to the accompanying drawings.

Figure 1:
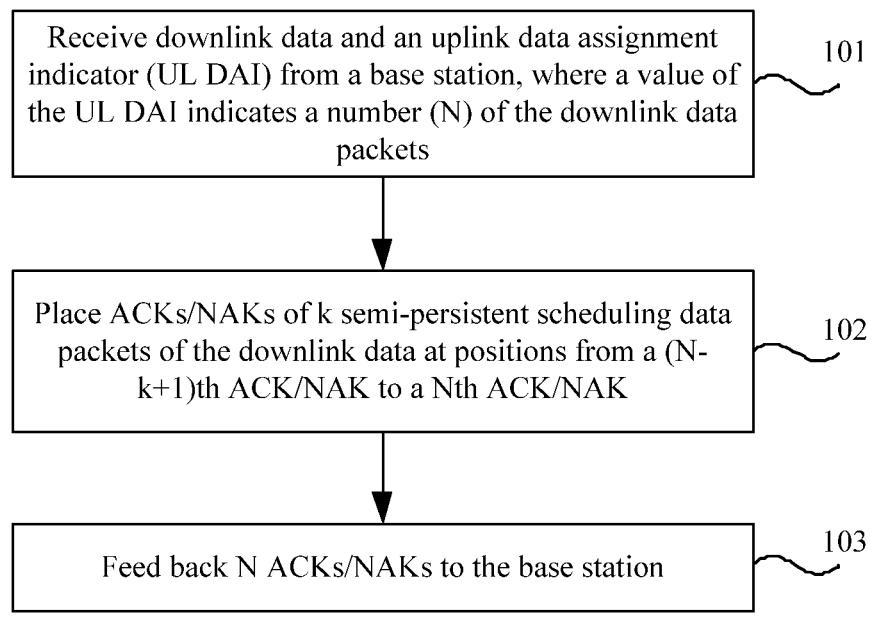
FIG. 1 is a flowchart of a method for feeding back ACK information of SPS data packets according to an embodiment of the present invention.

FIG. 1 is a flowchart of a method for feeding back acknowledgement information of SPS data packets according to an embodiment of the present invention. As shown in FIG. 1, the method includes the following steps.

Step 101: Receive downlink data and an uplink data assignment indicator (UL DAI) from a base station (BS), where a value of the UL DAI indicates a number (N) of data packets to be received. In N data packets, k data packets are semi-persistent scheduling (SPS) data packets, and k is greater than 0. For each received data packet, an ACK or a NAK is generated.

Step 102: Generating a feedback sequence. In the feedback sequence, ACKs/NAKs of the k semi-persistent scheduling data packets are placed at the $(N-k+1)^{th}$ to the $N^{th}$ positions of the feedback sequence.

Step 103: Send the feedback sequence comprising N ACKs/NAKs to the base station.

In step 102, the ACKs/NAKs of the k semi-persistent scheduling data packets may be placed at the $(N-k+1)^{th}$ position to the $N^{th}$ position of the feedback sequence in a positive order or a negative order according to an order of reception of k semi-persistent scheduling data packets.

Step 102 may further include placing ACKs/NAKs of non-semi-persistent scheduling (i.e. dynamic scheduling) data packets of the downlink data at the first position to the $(N-k)^{th}$ position of the feedback sequence. Specifically, a downlink data assignment indicator (DL DAI) is received from the base station, where a value of the DL DAI indicates that a downlink data packet is an $M^{th}$ non-semi-persistent scheduling data packet of the downlink data packets. An ACK/NAK of the $M^{th}$ non-semi-persistent scheduling data packet is placed at the $M^{th}$ position of the feedback sequence.

In this embodiment, the ACKs/NAKs of the k semi-persistent scheduling data packets of the downlink data are placed at the positions from the $(N-k+1)^{th}$ ACK/NAK to the $N^{th}$ ACK/NAK. When the semi-persistent scheduling activation PDCCH signaling or the override PDCCH signaling of the semi-persistent scheduling subframes is lost, the UE cannot differentiate whether the subframes are dynamic scheduling subframes or semi-persistent scheduling subframes. However, if the ACKs/NAKs of the k semi-persistent scheduling data packets of the downlink data are placed at the positions from the $(N-k+1)^{th}$ ACK/NAK to the $N^{th}$ ACK/NAK, the base station can receive the feedback information correctly.

Figure 2:
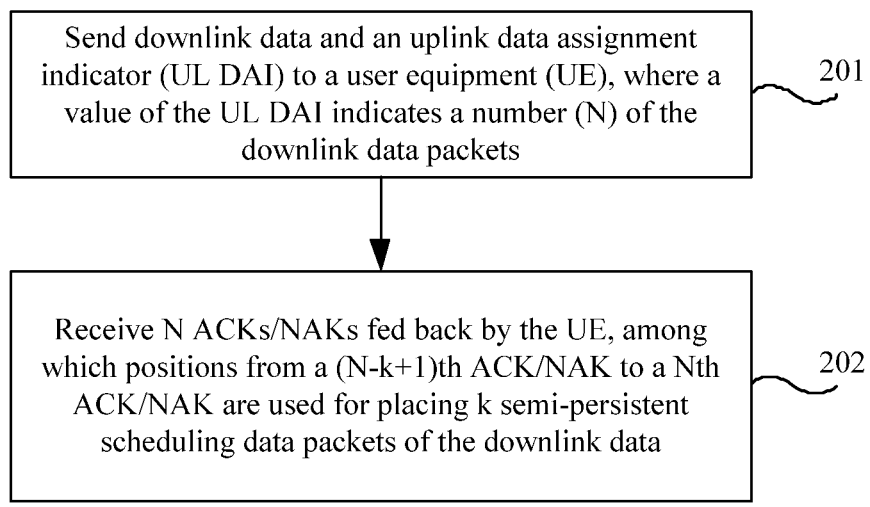
FIG. 2 is a flowchart of a method for receiving ACK information of SPS data packets according to an embodiment of the present invention.

FIG. 2 is a flowchart of a method for receiving feedback information of SPS data packets in another embodiment of the present invention. As shown in FIG. 2, the method includes the following steps.

Step 201: Send downlink data and an uplink data assignment indicator (UL DAI) to a user equipment device (UE), where a value of the UL DAI indicates a number (N) of the downlink data packets.

Step 202: Receive a sequence comprising N ACKs/NAKs from the UE. In the sequence, from the $(N-k+1)^{th}$ position to the $N^{th}$ position are used for placing feedback information of k semi-persistent scheduling data packets of the downlink data packets.

When the base station receives a negative feedback i.e. a NAK, responding to a semi-persistent scheduling activation subframe, another semi-persistent scheduling activation signaling is transmitted at a next time of semi-persistent transmission or at time of semi-persistent scheduling retransmission. The transmitted signaling is the same as or different from the semi-persistent scheduling activation signaling.

In the step 202, the ACKs/NAKs of the non-SPS data packets of the downlink data packets are placed at the positions from the first ACK/NAK in the feedback sequence. A downlink data assignment indicator (DL DAI) is sent to the UE, where a value of the DL DAI indicates that the downlink data packet is a $M^{th}$ non-SPS data packet of the downlink data packets. M ACKs/NAKs are received from the UE, among which the ACK/NAK of the $M^{th}$ non-SPS data packet is placed at the position of a $M^{th}$ ACK/NAK.

The ACKs/NAKs of k SPS data packets of the downlink data packets are placed to the positions from the $(N-k+1)^{th}$ ACK/NAK to the $N^{th}$ ACK/NAK. When the SPS activation PDCCH signaling or the override PDCCH signaling of the SPS subframes is lost, the UE cannot differentiate whether the subframes are dynamic scheduling subframes or SPS subframes. However, if the ACKs/NAKs of k SPS data packets of the downlink data packets are placed to positions from the $(N-k+1)^{th}$ ACK/NAK to the $N^{th}$ ACK/NAK, the N ACKs/NAKs can be arranged correctly. Thus, the BS can correctly receive the feedback information from the UE, unnecessary data retransmissions may be reduced, thus saving resources.

The preceding embodiments are based on the TDD mode. The TDD mode has the following features: Subframes 0 and 5 must be downlink subframes; subframe 2 must be an uplink subframe; the DwPTS may transmit downlink data or not transmit data; the rest of the subframes may be assigned as uplink or downlink subframes flexibly.

TABLE 1

Assignment ratio of uplink subframes to downlink subframes in the TDD system

| Uplink-downlink sub-frames | Sub-Frame No. | | | | | | | | | |
|---|---|---|---|---|---|---|---|---|---|---|
| Assignment ratio | 0 | 1 | 2 | 3 | 4 | 5 | 6 | 7 | 8 | 9 |
| 3:1 (5 ms) | D | S | U | U | U | D | S | U | U | U |
| 2:2 (5 ms) | D | S | U | U | D | D | S | U | U | D |
| 1:3 (5 ms) | D | S | U | D | D | D | S | U | D | D |
| 3:6 (10 ms) | D | S | U | U | U | D | D | D | D | D |
| 2:7 (10 ms) | D | S | U | U | D | D | D | D | D | D |
| 1:8 (10 ms) | D | S | U | D | D | D | D | D | D | D |
| 5:3 (10 ms) | D | S | U | U | U | D | S | U | U | D |

As shown in Table 1, seven uplink-to-downlink assignment ratios are defined in the 3GPP E-UTRA system, including three assignment ratios for the period of 5 ms, namely, 1:3, 2:2 and 3:1, and four assignment ratios for the period of 10 ms, namely, 6:3, 7:2, 8:1 and 3:5. Except for the assignment ratios of 1:3 and 3:5, the assignment ratios may cause the following result: ACKs/NAKs of N (greater than 1) downlink subframes need to be sent in one uplink subframe.

Taking the assignment ratio of 2:2 as an example, when the DwPTS transmits downlink data, the ACK/NAK feedbacks to the downlink subframes should be assigned to the downlink subframes evenly. Thus, one of two uplink subframes must feedback ACKs/NAKs of two downlink subframes. These N downlink subframes may be dynamic scheduling subframes or SPS subframes. The BS may schedule one or multiple downlink subframes of N downlink subframes. For example, it may schedule only one downlink subframe or all of the N downlink subframes, which is determined by a scheduler of the BS according to services. The dynamic scheduling is a random scheduling, in which only one downlink subframe can be scheduled at one time. The BS may dynamically schedule any downlink subframe. A PDCCH is required in the dynamic scheduling of each downlink subframe. The SPS is a mode in which multiple downlink subframes are scheduled by period. Except that a PDCCH is required in the SPS of the first downlink subframe, no PDCCH is required in the subsequent SPS of downlink subframes.

The 3GPP LTE technology defines several requirements in order to avoid HARQ interaction errors. The requirements are as follows.

1. A 2-bit UL DAI is used in the UL Grant to indicate the number of PDSCH subframes scheduled for the UE. The PDSCH subframes include dynamic scheduling subframes and SPS subframes. In certain cases, for example when the number of SPS subframes is preset, the value of the UL DAI may indicate the number of non-SPS subframes only. In these cases, the UE obtains the number (N) of PDSCH subframes by counting the sum of the number of SPS subframes and the number of non-SPS subframes indicated by the UL DAI, and N its the number of uplink ACKs/NAKs that the UE needs to feed back.

2. A 2-bit DL DAI is used in the DL Grant to indicate the current number of PDSCH subframes assigned to the UE. In ACK/NAK multiplexing mode, the DL DAI counts only the number of PDSCH subframes assigned to the UE until the current time by using a counter, and the number of SPS subframes is not counted. The SPS subframes may be subframes that carry downlink SPS data without a resource scheduling index signaling. The resource scheduling index signaling is for example, a PDCCH. The SPS subframes may further be subframes that carry downlink SPS data and SPS override PDCCH. The SPS subframes may also be subframes that carry downlink SPS data and include subframes carrying the SPS activation signaling PDCCH and subframes of the SPS override PDCCH. The dynamic scheduling subframe may be a subframe that carries downlink data with a resource scheduling index signaling (e.g., a PDCCH).

3. In uplink ACK/NAK multiplexing mode, the first position among N ACKs/NAKs fed back by the UE is the ACK/NAK of a SPS subframe. The UL ACKs/NAKs of other subframes are arranged according to the sequence as indicated by the DL DAI.

4. If the UE does not detect data in a subframe, the UE feeds back a NAK.

In uplink ACK/NAK multiplexing mode in the prior art, in case there is one SPS subframe, the first bit of N ACKs/NAKs that the UE feeds back according to the UL DAI is the ACK/NAK of a SPS subframe. The ACKs/NAKs of other dynamic scheduling subframes are arranged according to the sequence as indicated in the DL DAI. If the UE does not detect data in a subframe, the UE feeds back a NAK. Thus, when the SPS activation PDCCH is lost, errors may occur in UL ACK/NAK multiplexing feedback because the UE cannot differentiate whether a received subframe is a dynamic subframe or an SPS subframe.

Figure 3:
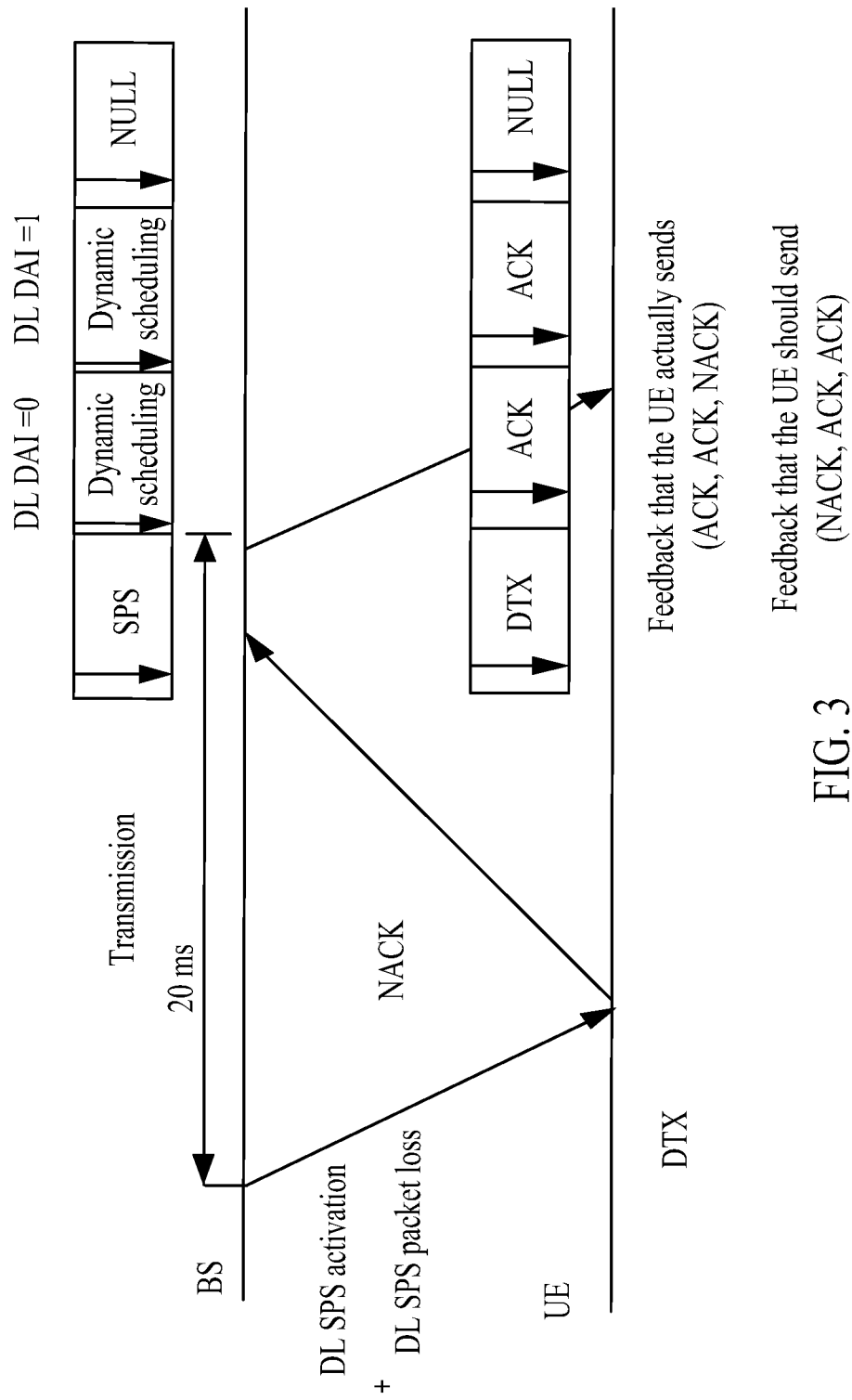
FIG. 3 is a schematic drawing illustrating the receiving of SPS subframes in a method for receiving feedback information of SPS data packets according to another embodiment of the present invention.

FIG. 3 is a schematic drawing illustrating the receiving of SPS subframes in a method for receiving feedback information of SPS data packets according to another embodiment of the present invention. As shown in FIG. 3, the SPS transmission is activated by a downlink resource assignment (DL Grant) signaling. The frequency resources indicated by the DL Grant are for carrying semi-persistent transmission data packets. If the UE does not receive the DL Grant signaling, it should feedback discontinuous transmission (DTX), which means no data is received, but the UE actually feeds back a NAK. The BS cannot determine whether the NAK indicates that the UE did not receive the DL Grant signaling, or it indicates that the UE received the DL Grant signaling but errors occurred during the detection of SPS data packets. If the BS believes that the NAK indicates that the UE received the DL Grant signaling, it thinks that the SPS resources are already activated, and sends new SPS data packets after a certain period. Because the DL Grant is unavailable in the SPS mode, the UE cannot obtain correct SPS data within a certain period.

As shown in Table 1, supposing when the BS retransmits SPS data packets, the assignment ratio of uplink subframes to downlink subframes is 1:3, the first subframe carries semi-persistent data packets and the second and third subframes are dynamic scheduling subframes. Based on prior art, the values of the DL DAIs in the DL Grants of the second and third subframes should be 0 and 1 respectively, and the value of the DAI in the UL Grant of the uplink subframe is 3. When the UE receives the four downlink subframes, supposing the second subframe is received correctly, the third subframe is also received correctly. When the UE sends feedback in the uplink, it does not think that the first subframe is an SPS subframe because the DAI of the UL Grant is 3, the DL DAI of the DL Grant of the received second subframe is 0, and the UE does not receive PDCCH of the SPS activation frame. This is caused by the requirement in the prior art that the ACK/NAK of the SPS subframe must be fixed at the first position of the multiplexing group. Thus, the UE feeds back an ACK, an ACK and a NAK, but the BS expects the UE to feed back a NAK, an ACK, and an ACK. This is caused by the difference between judgments of the BS and the UE about whether the first subframe is an SPS subframe. Further, the UE does not receive the SPS activation signaling, but the BS thinks that the UE receives the SPS activation signaling. As a result, the UE feeds back a NAK responding to the SPS data packets within the SPS duration, and the BS does not retransmit the PDCCH. Thus, the UE does not know the position of the semi-persistent transmission, which causes unnecessary retransmissions.

This embodiment provides an improved solution for overcoming the shortcomings of the prior art, in which when the BS retransmits SPS data packet the assignment ratio of uplink subframes to downlink subframes is 1:3, and feedback errors occur when the ACK/NAK of the SPS subframe must be fixed at the first position of the multiplexing group (N ACKs/NAKs). The improved solution is that when the UL ACK/NAK multiplexing is performed, the uplink ACK/NAK associated with the SPS downlink subframe is fixed at the last position in the multiplexing group (N ACKs/NAKs) for transmission.

If the DwPTS can also carry downlink data, four downlink subframes and one uplink subframe are available within 5 ms. If three downlink subframes are scheduled for one UE, the first one of these three downlink subframes is an SPS subframe and the second and third downlink subframes are dynamic scheduling subframes, i.e. carry downlink dynamic scheduling data. In this case, the UL DAI may indicate the total number of scheduled downlink subframes of the UE. A value of the UL DAI is 3. Because the first downlink subframe is a SPS subframe, the number of the SPS subframes does not be counted in to the DL DAI parameter. The second downlink subframe is the dynamic scheduling subframe, a value of the DL DAI corresponding to the second downlink subframe is 0. The third downlink subframe is also a dynamic scheduling subframe, and a value of the DL DAI corresponding to the third downlink subframe is 1. If the UE loses the semi-persistent transmission data packet (downlink subframe 1) and activation DL Grant of the semi-persistent transmission, but receives dynamic scheduling data of other subframes, the UE cannot know that the first downlink subframe is an SPS subframe. The UE determines that three UL ACKs/NAKs need to be fed back based on the fact that the UL DAI is 3. Because the DL DAI of the second downlink subframe is 0, the UE may misunderstand that the second downlink subframe is a first downlink subframe scheduled by the BS, and then feedback an ACK at a first position of N ACKs/NAKs. According to the fact that the DL DAI is 1 at the third downlink subframe, the UE determines that the third downlink subframe is a second scheduled downlink subframe, and feeds back an ACK at the second position of the N ACKs/NAKs. Because no data is detected at the fourth downlink subframe, the UE may determine that the fourth downlink subframe is the third scheduled subframe which is not received, and then feedback a NAK at the third position of the N ACKs/NAKs. Thus, the UE feeds back an ACK, an ACK, and a NAK.

According to this embodiment of the invention, when sending feedback information in the multiplexing mode, the uplink ACK/NAK of the semi-persistent scheduling downlink subframe is fixed at the last position in the multiplexing group for transmission. That is, the UE places the ACK/NAK of the SPS subframe at the third position among the three ACKs/NAKs. Thus, the BS should receive three feedbacks ACK, ACK, and NAK. In this case, the sequence of ACKs/NAKs that the UE sends is the same as that of ACKs/NAKs that the BS should receive.

In addition, in this embodiment, if the BS receives a NAK feedback responding to a semi-persistent scheduling activation subframe, the BS transmits another PDCCH, which is same as the semi-persistent scheduling activation PDCCH, in a next period of semi-persistent data transmission, or the BS retransmits a PDCCH which is same as a semi-persistent scheduling activation PDCCH at a position for semi-persistent scheduling subframe retransmission. The UE transmits or receives semi-persistent scheduling data according to resources indicated by the PDCCH, and activates the semi-persistent scheduling transmission.

In this embodiment of the invention, the ACK/NAK of semi-persistent scheduling data packet of the downlink data is placed at the position of the third ACK/NAK for feedback. Thus, when the semi-persistent scheduling activation PDCCH signaling is lost, the UE cannot differentiate whether the subframes are dynamic scheduling subframes or semi-persistent scheduling subframes. If the ACK/NAK of the semi-persistent scheduling data packet of the downlink data is placed at the position of the third ACK/NAK for feedback, the three ACKs/NAKs can be arranged correctly. In addition, this embodiment takes only the assignment ratio of the uplink subframes 1:3 as an example. Other six assignment ratios are also applicable to the present invention, and will not be further described.

Furthermore, when the SPS transmission is activated, a new DL Grant may be used to replace the previous semi-persistent scheduling configuration when the period of the SPS transmission expires. When a subframe of an override PDCCH is counted into the DL DAI, and the ACK/NAK associated with the SPS subframe needs to be placed at the first position of the multiplexing ACK/NAK sequence, errors may occur if the PDCCH subframe is lost.

Figure 4:
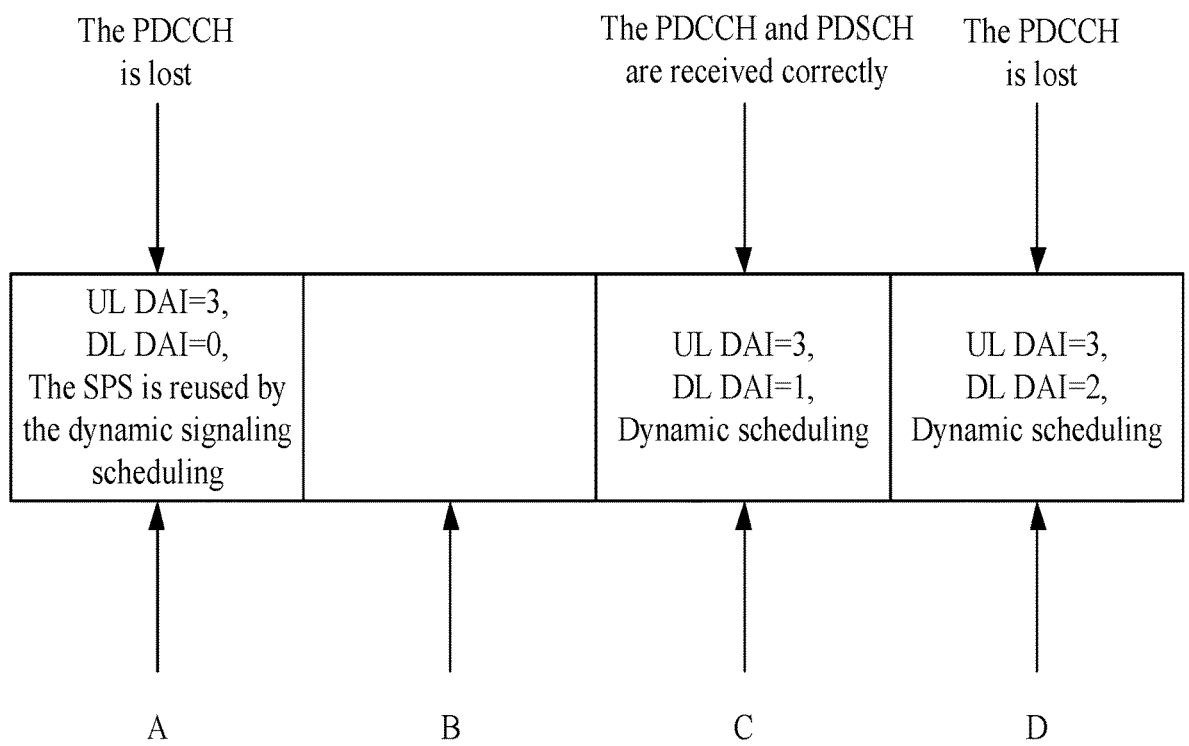
FIG. 4 is a schematic drawing illustrating the receiving of SPS subframes in a method for receiving feedback information of SPS data packets according to another embodiment of the present invention.

FIG. 4 is a schematic drawing illustrating the receiving of semi-persistent scheduling subframes in a method for receiving acknowledgement information of semi-persistent scheduling data packets according to another embodiment of the present invention. As shown in FIG. 4, the BS schedules three downlink subframes. The assignment ratio of the uplink subframes to the downlink subframes is 1:3. In this case, the value of UL DAI is 3. Subframe A is an SPS override subframe. Thus, the value of DL DAI of the SPS override subframe is 0. Subframes C and D are dynamic scheduling subframes, and their value of DL DAIs are respectively 1 and 2. When the SPS override PDCCH is in the subframe A, if the PDCCHs of subframe A and D are all lost, only subframe C is correctly received. In this case, the UE knows that the value of the UL DAI of the subframe C is 3 and the value of the DL DAI of subframe C is 1. However, the UE does not know that subframe A is an SPS override subframe. Instead, the UE thinks that subframe A is an SPS subframe that is not counted in the DL DAI. Thus, the UE may misunderstand that subframe B is the subframe of which the DL DAI is 0. As a result, when the ACK/NAK associated with the SPS subframe is fixed at the first position in the multiplexing feedback sequence, the UE feeds back a NAK, a NAK and an ACK, but the BS should receive the feedbacks NAK, ACK and NAK. As a result, the feedbacks of the UE actually sends is different from that of the BS should receive.

This embodiment of the invention provides an improved solution for overcoming the shortcomings of the prior art. The improved solution is as follows:

When the assignment ratio of the uplink subframes to the downlink subframes is 1:3, four downlink subframes and one uplink subframe are available within the period of 5 ms if the DwPTS can carry downlink data. When the UL ACK/NAK multiplexing is performed on the uplink ACKs/NAKs associated with the SPS downlink subframes, the uplink ACK/NAK is fixed at the last position in N ACKs/NAKs for transmission. That is, the ACK/NAK is fixed at the third position. In this case, the BS should receive the feedbacks NAK, ACK and NAK. According to the fact that the DL DAI and UL DAI of subframe C are respectively 1 and 3, the UE may misunderstand that subframe B is a dynamic scheduling subframe and feed back a NAK responding to subframe B, and that subframe A is an SPS subframe and feed back a NAK responding to subframe A at the last position in the UL ACK/NAK multiplexing group. The UL ACKs/NAKs of other subframes are arranged according to the sequence of the DL DAI. The UE actually feeds back a NAK, an ACK and a NAK. In this case, the sequence of feedbacks that the UE actually sends is the same as that of feedbacks that the BS should receive.

This embodiment of the invention places the ACK/NAK of semi-persistent scheduling data packet of the downlink data at the position of the third ACK/NAK for feedback. Thus, when the override PDCCH signaling of the semi-persistent scheduling subframes is lost, the UE cannot differentiate whether the subframes are dynamic scheduling subframes or semi-persistent scheduling subframes. If the ACK/NAK of the SPS data packet of the downlink data is placed at the position of the third ACK/NAK for feedback, the sequence of feedbacks that the UE actually sends is the same as that of feedbacks that the BS should receive. In addition, this embodiment takes only the assignment ratio of the uplink subframes is 1:3 as an example. Other six assignment ratios are also applicable to the present invention, and will not be further described.

Figure 5:
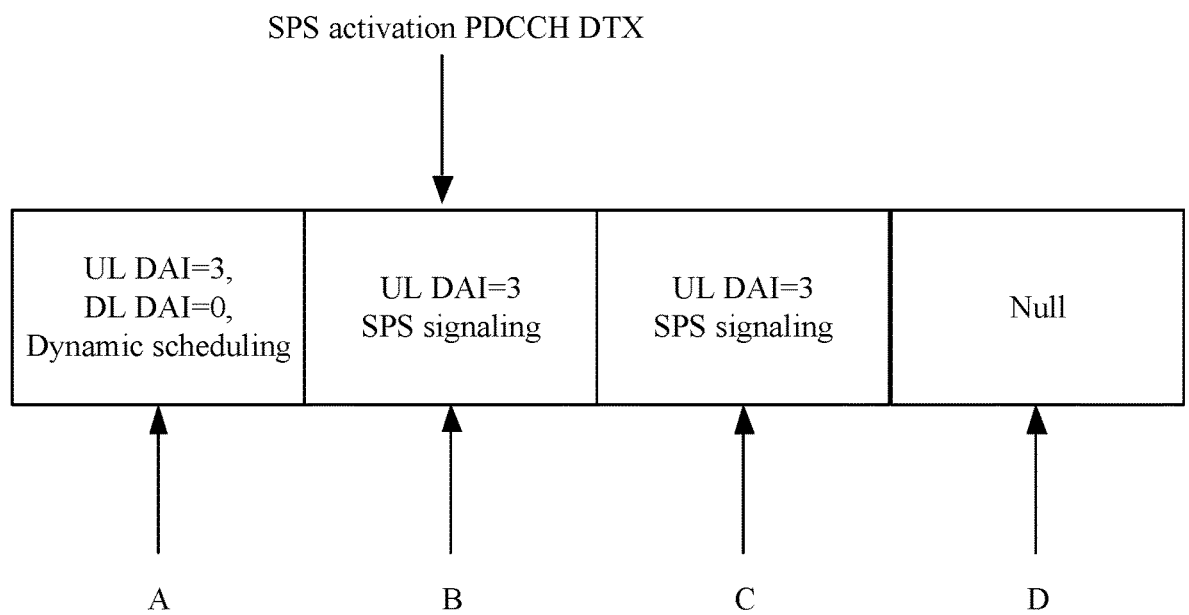
FIG. 5 is a schematic drawing illustrating the receiving of SPS subframes in a method for receiving feedback information of SPS data packets according to another embodiment of the present invention.

The embodiment shown in FIG. 3 is based on the fact that the SPS activation PDCCH of an SPS subframe is lost. However, the number of transmitted SPS subframes is not limited to 1 in this embodiment. In another embodiment of the invention, it is assumed that there are two SPS subframes, among which the SPS activation PDCCH of one SPS subframe is lost, and the other SPS subframe is transmitted normally. FIG. 5 is a schematic drawing illustrating the receiving of SPS subframes in this embodiment of the present invention. As shown in FIG. 5, subframe B is the SPS subframe of which the SPS activation PDCCH is lost, and subframe C is the SPS subframe that is normally transmitted without DL Grant. Errors may occur if the ACK/NAK of the SPS data packet of the downlink data is placed at the position of the first ACK/NAK for feedback. The specific analysis is as follows.

The BS schedules three downlink subframes for the UE, and value of the UL DAI is 3. Subframe A carries dynamic scheduling data. In this case, value of the DL DAI is 0, and the UE receives the subframe and feeds back an ACK. That is, an ACK is fed back because of DL DAI=0. The UE does not receive PDCCH of the SPS activation subframe at the position of subframe B. Thus, the UE does not think that subframe B is an SPS subframe, but is mistaken that subframe B is a dynamic scheduling subframe. As a result, the UE feeds back a NAK at the third position. Subframe C is an SPS subframe that is normally transmitted without DL Grant. The UE receives the subframe C and should feedback an ACK at the first position. In fact, the UE feeds back an ACK, an ACK and a NAK. The BS should receive the feedbacks NAK, ACK and ACK. In this case, the sequence of feedbacks that the UE actually sends is different from that of feedbacks that the BS should receive.

To solve this problem, this embodiment arranges the ACKs/NAKs associated with the SPS subframes behind the ACKs/NAKs associated with the dynamic scheduling subframes in a certain sequence when the UL ACK/NAK multiplexing is performed on the uplink ACKs/NAKs associated with the SPS downlink subframes. According to this embodiment, value of the DL DAI of subframe A is 0, and subframe A is a dynamic scheduling subframe which an ACK should be fed back, where the ACK should be placed at the position of the first ACK/NAK. Subframe B is an SPS subframe to which a NAK should be fed back; subframe C is an SPS subframe to which an ACK should be fed back at the position of the third ACK/NAK. The positions of ACKs/NAKs of the SPS subframes are arranged according to the arrival sequence of subframes B and C. The BS should receive the feedbacks ACK, NAK and ACK. According to the fact that values of the DL DAI and UL DAI of subframe A are respectively 0 and 3, the UE may determine that subframe A is a dynamic scheduling subframe and feed back an ACK at the first position because value of the DL DAI is 0. Because the PDCCH of subframe B is lost, the UE may misunderstand that subframe B is a dynamic scheduling subframe, and feed back a NAK at the second position of the UL ACK/NAK. Subframe C is an SPS subframe and is received correctly. In this case, an ACK is placed at the last position. In fact, the UE feeds back an ACK, a NAK and an ACK. In this case, the sequence of feedbacks that the UE actually sends is the same as that of feedbacks that the BS should receive.

This embodiment places respectively the ACKs/NAKs of two SPS data packets of the downlink data at the positions of the second and third ACKs/NAKs for feedback. Thus, when the SPS activation PDCCH signaling is lost, the UE cannot differentiate whether the subframes are dynamic scheduling subframes or SPS subframes. If the ACKs/NAKs of the SPS data packets of the downlink data are placed respectively at the positions of the second and third ACKs/NAKs for feedback, the three ACKs/NAKs can be arranged correctly. In addition, this embodiment takes only two SPS data packets as an example. More than two SPS data packets may also be applicable to the present invention. This embodiment is based on the condition that the SPS activation PDCCH signaling is lost. The following conditions are also applicable to the present invention: The SPS activation PDCCH signaling is lost and the normal SPS data packet is lost, which will not be further described. Furthermore, this embodiment takes only the assignment ratio of the uplink subframes is 1:3 as an example. The other six assignment ratios are also applicable to the present invention, and will not be further described.

The preceding embodiments are based on the condition that the BS schedules three downlink subframes for the UE. In another embodiment of the present invention, a method for receiving feedback information of SPS data packets is provided. The method is illustrated by example using the following conditions: The assignment ratio of uplink subframes to downlink subframes is 1:3; four downlink subframes are available within the period of 5 ms; the BS schedules four downlink subframes for the UE; and when the semi-persistent transmission begins, the transmission of SPS subframe data packets fails and the PDCCHs of dynamic subframes are lost.

Figure 6:
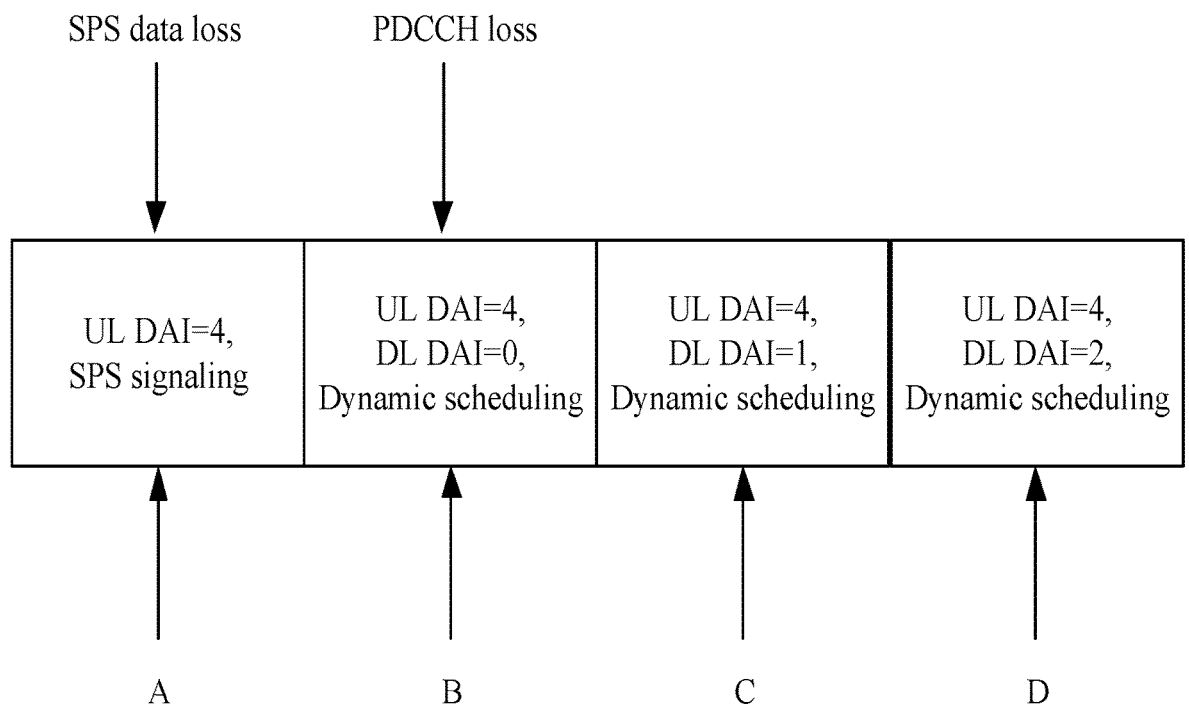
FIG. 6 is a schematic drawing illustrating the receiving of SPS subframes in a method for receiving feedback information of SPS data packets according to another embodiment of the present invention.

FIG. 6 is a schematic drawing illustrating the receiving of SPS subframes in the method for receiving ACK information of SPS data packets according to this embodiment of the present invention. As shown in FIG. 6, if the DwPTS can carry downlink data, four downlink subframes and one uplink subframe would be available within the period of 5 ms. When the semi-persistent transmission begins, the UE receives semi-persistent transmission data subframes at a fixed time within a certain period if the transmission of SPS subframe A fails and the PDCCH of dynamic subframe B is lost. When the UL ACK/NAK multiplexing is performed on the uplink ACKs/NAKs associated with the SPS downlink subframe, the uplink ACK/NAK is fixed at the last position in the multiplexing group for transmission. The UE knows that subframe A is an SPS subframe and detects that data in the subframe A is lost. Then, the UE feeds back a NAK. The UE does not detect PDCCH of subframe B. The UE detects data in subframe C, and deduces that the lost subframe B is a dynamic data scheduling subframe according to the fact that the value of the DL DAI is 1. The UE detects that subframe D is correctly received, and feeds back an ACK. Because the value of the UL DAI is 4, the UE needs to feed back four ACKs/NAKs. According to the arrangement sequence of the DL DAI and the rule of placing the feedback of SPS subframes at the last positions, the UE send the feedbacks in the following order: NAK, ACK, ACK, and NAK. Further, the BS should receive the feedbacks NAK, ACK, ACK and NAK. Thus, the sequence of feedbacks that the UE actually sends is the same as that of feedbacks that the BS should receive.

Figure 7:
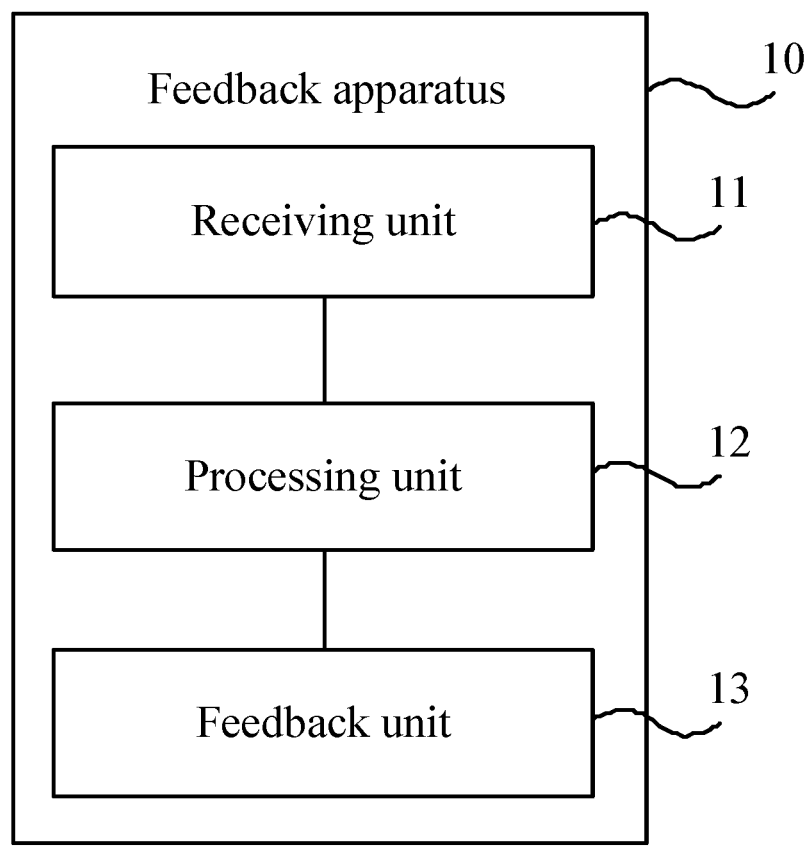
FIG. 7 is a block diagram of an apparatus for feeding back ACK information of SPS data packets according to an embodiment of the present invention.

FIG. 7 shows a block diagram of an apparatus for sending feedback information of SPS data packets according to an embodiment of the present invention. The apparatus 10 includes a receiving unit 11, configured to receive downlink data and an uplink data assignment indicator (UL DAI) from a base station (BS). A value of the UL DAI indicates a number (N) of the downlink data packets. The apparatus 10 also includes a processing unit 12, configured to place the ACKs/NAKs of k SPS data packets of the downlink data packets at positions from a $(N-k+1)^{th}$ ACK/NAK to a $N^{th}$ ACK/NAK. The apparatus further includes a feedback unit 13, configured to feed back N ACKs/NAKs to the BS.

The processing unit 12 is further configured to place ACKs/NAKs of non-SPS data packets of the downlink data packets at positions from a first ACK/NAK among the N ACKs/NAKs. The process includes receiving a downlink data assignment indicator (DL DAI) from the BS, where a value of the DL DAI indicates that the downlink data packet is an $M^{th}$ non-SPS downlink data packet; and placing the ACK/NAK of the $M^{th}$ non-SPS data packet at a position of an $M^{th}$ ACK/NAK.

In addition, the processing unit 12 may place the ACKs/NAKs of the k SPS data packets of the downlink data packets at the positions from the $(N-k+1)^{th}$ ACK/NAK to the $N^{th}$ ACK/NAK in positive or negative sequence. The details are given in preceding embodiments of the present invention, and will not be further provided.

The ACKs/NAKs of the k SPS data packets of the downlink data are placed at the positions from the $(N-k+1)^{th}$ ACK/NAK to the $N^{th}$ ACK/NAK. As a result, even if the SPS activation PDCCH signaling or the override PDCCH signaling of the SPS subframes is lost and the UE cannot differentiate whether the subframes are dynamic scheduling subframes or SPS subframes, the base station can still correctly receive the feedback information from the UE.

Figure 8:
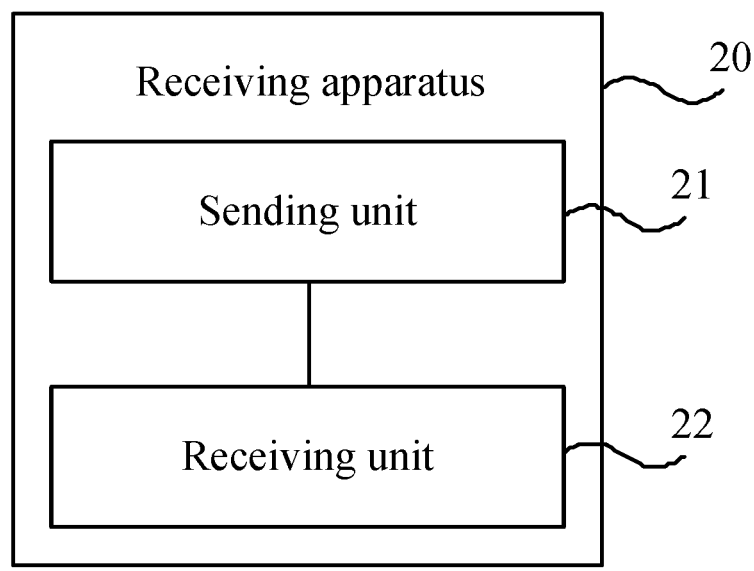
FIG. 8 is a block diagram of an apparatus for receiving ACK information of SPS data packets according to an embodiment of the present invention.

FIG. 8 shows a block diagram of an apparatus for receiving feedback information of SPS data packets according to an embodiment of the present invention. The apparatus 20 includes a sending unit 21, configured to send downlink data and an uplink data assignment indicator (UL DAI) to a user equipment device (UE). A value of the UL DAI indicates a number (N) of the downlink data packets. The apparatus 20 also includes a receiving unit 22, configured to receive N ACKs/NAKs fed back by the UE, among which the (N-k+

$1)^{th}$ ACK/NAK to the $N^{th}$ ACK/NAK are feedbacks of k SPS data packets of the downlink data packets. When the receiving unit 22 receives a feedback NAK to an SPS activation subframe, the sending unit 21 is further configured to transmit another SPS activation signaling at a next time of semi-persistent transmission, or transmit another SPS activation signaling at time of SPS retransmission, where the retransmitted signaling is the same as or different from the SPS activation signaling. In addition, the ACKs/NAKs of the non-SPS data packets of the downlink data packets are placed at positions starting from the first position of the N ACKs/NAKs. The process includes sending a downlink data assignment indicator (DL DAI) to the UE, where a value of DL DAI indicates that the downlink data packet is a $M^{th}$ non-SPS downlink data packet; and receiving M ACKs/NAKs fed back by the UE, among which the $M^{th}$ non-SPS data packet is placed at the position of the $M^{th}$ ACK/NAK. The details are given in the preceding embodiments and are not repeated here.

In embodiments of the present invention, the ACKs/NAKs of k SPS data packets of the downlink data packets are placed at positions from the $(N-k+1)^{th}$ ACK/NAK to the $N^{th}$ ACK/NAK. Even if when the SPS activation PDCCH signaling or the override PDCCH signaling of the SPS subframes is lost and the UE cannot differentiate whether the subframes are dynamic scheduling subframes or SPS subframes, N ACKs/NAKs can be received correctly. Thus, when the BS receives feedback information of N ACKs/NAKs that correctly indicate the reception of downlink subframes, unnecessary data retransmissions may be reduced, thus saving resources.

Through the preceding description, it is understandable that the embodiments of the present invention may be implemented by hardware or software in combination with a necessary hardware platform. Thus, the technical solution of the present invention may be made into a program product. The program product may be stored in a storage medium (for example, a CD-ROM, a USB flash disk, and a movable hard disk), and include instructions that enable a computer device (for example, PC, server, or network device) to perform the methods provided in each embodiment of the present invention.

Although the present invention has been described through some exemplary embodiments and accompanying drawings, the invention is not limited to such embodiments. It is apparent that those skilled in the art can make various modifications and variations to the invention without departing from the spirit and scope of the invention.

What is claimed is:

1. A method for sending and receiving information in a radio communication system, comprising:
   receiving, by a communication apparatus, physical downlink shared channel (PDSCH) data packets from a base station, wherein the PDSCH data packets comprise one or more dynamic scheduling data packets and one or more semi-persistent scheduling (SPS) data packets; and
   sending, by the communication apparatus to the base station, a sequence comprising feedback information of the PDSCH data packets, wherein the sequence comprises a plurality of bits, each bit carries an acknowledgement (ACK) or a negative acknowledgement (NAK) to one PDSCH data packet respectively, and wherein the bits carrying the ACKs/NAKs of the one or more SPS data packets are arranged at the end of the sequence.

2. The method according to claim 1, wherein one data packet is carried in one subframe.

3. The method according to claim 2, further comprising:
   receiving, by the communication apparatus, an uplink data assignment indicator (UL DAI) from the base station, wherein the UL DAI indicates quantity of the PDSCH subframes.

4. The method according to claim 2, further comprising:
   receiving, by the communication apparatus, a downlink data assignment indicator (DL DAI) from the base station, wherein the DL DAI indicates a serial number of a PDSCH subframe in a current transmission period.

5. The method according to claim 1, wherein the one or more SPS data packets is one SPS data packet.

6. The method according to claim 5, wherein the ACK or NAK of the SPS data packet is placed at the last bit of the sequence regardless of a transmission order of the PDSCH data packets.

7. The method according to claim 1, wherein each of the one or more dynamic scheduling data packets is a PDSCH data packet associated with a physical downlink control channel (PDCCH), and each of the one or more SPS data packets is a PDSCH data packet not associated with a PDCCH.

8. A communication apparatus, comprising:
   a storage medium configured to store program instructions, and a processor coupled to the storage medium;
   wherein the program instructions, when executed by the processor, cause the communication apparatus to:
   obtain physical downlink shared channel (PDSCH) data packets from a base station, wherein the PDSCH data packets comprise one or more dynamic scheduling data packets and one or more semi-persistent scheduling (SPS) data packets; and
   respond to the base station, a sequence comprising feedback information of the PDSCH data packets, wherein the sequence comprises a plurality of bits, each bit carries an acknowledgement (ACK) or a negative acknowledgement (NAK) to one PDSCH data packet respectively, and wherein the bits carrying the ACKs/NAKs of the one or more SPS data packets are arranged at the end of the sequence.

9. The communication apparatus according to claim 8, wherein one data packet is carried in one subframe.

10. The communication apparatus according to claim 9, wherein the program instructions further cause the communication apparatus to:
    obtain an uplink data assignment indicator (UL DAI) from the base station, wherein the UL DAI indicates quantity of the PDSCH subframes.

11. The communication apparatus according to claim 9, wherein the program instructions further cause the communication apparatus to:
    obtain a downlink data assignment indicator (DL DAI) from the base station, wherein the DL DAT indicates a serial number of a PDSCH subframe in a current transmission period.

12. The communication apparatus according to claim 8, wherein the one or more SPS data packets is one SPS data packet.

13. The communication apparatus according to claim 12, wherein the ACK or NAK of the SPS data packet is placed at the last bit of the sequence regardless of a transmission order of the PDSCH data packets.

14. The communication apparatus according to claim 8, wherein each of the one or more dynamic scheduling data packets is a PDSCH data packet associated with a physical downlink control channel (PDCCH), and each of the one or more SPS data packets is a PDSCH data packet not associated with a PDCCH.

15. The communication apparatus according to claim 8, wherein the communication apparatus is a component of a user equipment device.

16. The communication apparatus according to claim 8, wherein the communication apparatus is a user equipment device.

17. A non-transitory storage medium storing program instructions, wherein when executed by a processor of a communication apparatus, the program instructions cause the communication apparatus to perform a method that comprises:
   receiving physical downlink shared channel (PDSCH) data packets from a base station, wherein the PDSCH data packets comprise one or more dynamic scheduling data packets and one or more semi-persistent scheduling (SPS) data packets; and
   sending to the base station, a sequence comprising feedback information of the PDSCH data packets, wherein the sequence comprises a plurality of bits, each bit carries an acknowledgement (ACK) or a negative acknowledgement (NAK) to one PDSCH data packet respectively, and wherein the bits carrying the ACKs/NAKs of the one or more SPS data packets are arranged at the end of the sequence.

18. The non-transitory storage medium according to claim 17, wherein one data packet is carried in one subframe.

19. The non-transitory storage medium according to claim 17, wherein the one or more SPS data packets is one SPS data packet.

20. The non-transitory storage medium according to claim 19, wherein the ACK or NAK of the SPS data packet is placed at the last bit of the sequence regardless of a transmission order of the PDSCH data packets.

21. The non-transitory storage medium according to claim 17, wherein each of the one or more dynamic scheduling data packets is a PDSCH data packet associated with a physical downlink control channel (PDCCH), and each of the one or more SPS data packets is a PDSCH data packet not associated with a PDCCH.

* * * * *